United States Patent [19]

Duncan et al.

[11] 4,421,972
[45] Dec. 20, 1983

[54] PULSED DIRECT CURRENT ARC WELDING

[75] Inventors: John R. Duncan, Tarzana; Roderick G. Rohrberg, Torrance; Ross A. Moyer, Lafayette; William E. Wright, Sr., E. Syracuse, all of N.Y.

[73] Assignee: Carrier Corporation, Syracuse, N.Y.

[21] Appl. No.: 252,567

[22] Filed: Apr. 9, 1981

[51] Int. Cl.³ .............................................. B23K 9/09
[52] U.S. Cl. .......................... 219/137 PS; 219/130.51
[58] Field of Search .......... 219/137 PS, 130.5, 130.51, 219/130.4

[56] References Cited

U.S. PATENT DOCUMENTS

| | | | |
|---|---|---|---|
| 3,510,676 | 5/1970 | Pierce, Jr. ....................... | 219/130.51 |
| 3,522,412 | 8/1970 | Bell et al. . | |
| 3,538,301 | 11/1970 | Bray et al. ....................... | 219/130.51 |
| 3,598,954 | 8/1971 | Iceland et al. . | |
| 3,614,378 | 10/1971 | Goodell et al. . | |
| 3,818,177 | 6/1974 | Needham et al. . | |
| 3,826,890 | 7/1974 | Bartlett . | |
| 3,838,244 | 9/1974 | Petrides et al. . | |
| 3,894,210 | 7/1975 | Smith et al. . | |
| 3,932,728 | 1/1976 | Maxwell ........................ | 219/130.4 |
| 3,989,922 | 11/1976 | Fahey . | |
| 3,995,138 | 11/1976 | Kalev et al. . | |
| 4,016,484 | 4/1977 | Crouthamel . | |
| 4,092,517 | 5/1978 | Woodacre . | |
| 4,123,646 | 10/1978 | Keinanen . | |

FOREIGN PATENT DOCUMENTS

| | | |
|---|---|---|
| 1123293 | 8/1968 | United Kingdom . |
| 1170113 | 11/1969 | United Kingdom . |
| 1213695 | 11/1970 | United Kingdom . |
| 479582 | 11/1975 | U.S.S.R. ........................ 219/137 PS |

OTHER PUBLICATIONS

P.T. Houldcroft, *Welding Process Technology*, 1977, pp. 82–100, 121.
A Look at the Brazing of Aluminum –Particularly Fluxless Brazing by O. R. Singleton in Welding Journal of Nov. 1970, pp. 843 through 849.
Safe and Sure Aluminum Brazing by H. K. Kerr and L. E. Pennington in Machine Design of Nov. 14, 1974, pp. 171 through 175.
The Future of Copper and Aluminum in Fluxless Vacuum Brazing of Aluminum by Harry K. Herr in Metal Progress of Dec. 1969, pp. 68 through 73.

*Primary Examiner*—C. C. Shaw
*Attorney, Agent, or Firm*—David L. Adour

[57] ABSTRACT

A method of arc welding is disclosed. Specifically, a method of pulsed direct current (DC) arc welding is disclosed wherein special pulses of positive direct current are used to weld together work pieces. The special DC pulses are capable of dissipating difficult to reduce oxides which may be present on the surfaces of the work pieces without using a flux. The method is especially useful for fluxless arc welding of aluminum, particularly thin wall aluminum tubing used in making heat exchangers for air conditioning systems.

6 Claims, 2 Drawing Figures

PULSED DIRECT CURRENT ARC WELDING

BACKGROUND OF THE INVENTION

This invention relates to arc welding and more particularly to pulsed direct current arc welding. Specifically, this invention relates to a method of pulsed direct current arc welding wherein special pulses of positive direct current are used to weld together work pieces, especially work pieces made of aluminum, without using a flux.

There are many situations in which it is desirable to arc weld together two pieces of metal. For example, heat exchangers for air conditioning systems may be made from sections of thin wall aluminum tubing which are joined to provide a continuous circuit for the flow of a refrigerant. The sections must be joined so that there are no leaks. One method of accomplishing this is by arc welding.

Moisture, grease, oil films, and other foreign materials on the surface of the metal can cause arc welds of poor quality. Metakls which form difficult to reduce oxide films on their surfaces, such as aluminum, magnesium, and beryllium copper, pose an especially difficult problem with respect to making a weld of good quality. The quality of the weld is affected because the foreign materials and oxides can become entrapped in the weld and cause porosity that may affect weld strength and ductility. Generally, a longer lasting, stronger and less porous weld results if these surface contaminents are removed prior to welding. Degreasing for removal of foreign materials other than oxides may be done with commercial solvents by wiping, spraying, dipping, vapor degreasing, or steam cleaning the metal, followed by a hot water rinse. The difficult to reduce oxides typically only may be removed by using certain chemical solutions which are difficult to handle. Some metals, such as aluminum, magnesium, and beryllium copper instantaneously reform oxide films when exposed to air. Thus, these metals are particularly difficult to arc weld since even if the oxides on these metals are removed prior to welding the metals must be maintained in an atmosphere in which oxides do not reform or other measures must be taken to prevent oxides from reforming if good quality welds are to be consistently made.

One method of dissipating difficult to reduce oxides on metals such as aluminum, magnesium, and beryllium copper is by using a flux to break up the oxides on the surfaces of the metals during the arc welding process. Typically, a nonmetal chlorine or fluorine base flux is applied to the weld joint as the metal is welded. The flux is corrosive and is not always compatible with the environment in which it is used. After a weld is made flushing is necessary to clean the welded area. This is time consuming and costly and does not provide complete assurance that all contamination is removed. An example of a method of direct current arc welding in which a flux is used is disclosed in U.S. Pat. No. 3,552,412 to Bell, et al.. This patent relates to a method of welding aluminum wherein Solar 202, an aluminum welding flux, is used to break down aluminum oxides.

Fluxless methods of arc welding metals, such as aluminum, magnesium, and beryllium copper, which form difficult to reduce oxide films on their surfaces, are known. For example, alternating current arc welding techniques, similar to the methods described in U.S. Pat. No. 3,894,210 to Smith, et al. and U.S. Pat. No. 3,818,177 to Needham, et al. can be used to weld such metals without using a flux. However, these alternating current arc welding techniques are intended primarily for welding relatively thick pieces of metal which do not require precise control of the power flow to the metal during the arc welding process. These techniques are not ideal for welding certain materials, such as thin wall aluminum tubing used in making heat exchangers for air conditioning systems.

It is preferable when welding thin wall aluminum tubing and other such materials to use a direct current arc welding process whereby power flow to the work pieces may be precisely controlled. Also, direct current arc welding has other benefits such as prolonging the life of electrodes used in the welding process. While direct current arc welding has these and other advantages for welding certain materials, such as thin wall aluminum tubing, direct current arc welding has not heretofore provided the capability of dissipating oxides which is possible when using certain alternating current arc welding techniques. Therefore, it is desirable to provide a fluxless arc welding method having the advantage of precise power control and other advantages inherent in direct current arc welding and having the oxide dissipation capability of certain alternating current welding techniques.

SUMMARY OF THE INVENTION

Therefore, it is an object of the present invention to provide a method of arc welding materials which form difficult to reduce oxides on their surfaces, such as aluminum.

Another object of the present invention is to provide a fluxless method of direct current arc welding for welding materials which form difficult to reduce oxides on their surfaces, such as aluminum.

A further object of the present invention is to provide a fluxless method of pulsed direct current arc welding wherein special positive pulses of direct current are used to weld materials which form difficult to reduce oxides on their surfaces, such as aluminum.

These and other objects of the present invention are accomplished by providing a pulsed positive direct current at an arc gap where work pieces, such as work pieces made from aluminum, are welded together. The magnitude of the direct current is cycled between a maintenance current level and a peak current value. The maintenance current is sufficient to maintain current flow across the arc gap but does not provide sufficient power flow to the work pieces to heat the work pieces to their melting temperature. The peak current provides sufficient power flow to the work pieces to be able to heat the work pieces to their melting temperature. Also, the peak current is selected so that the increase from the maintenance current level to the peak current value occurs in a short time interval whereby the increase is capable of dissipating oxides which may be present on the surfaces of the work pieces. Inert gas supplied to the arc gap during the welding process prevents reformation of oxides after the original oxides are dissipated by this sudden increase in current magnitude.

DESCRIPTION OF THE PREFERRED EMBODIMENT

Figure 1:
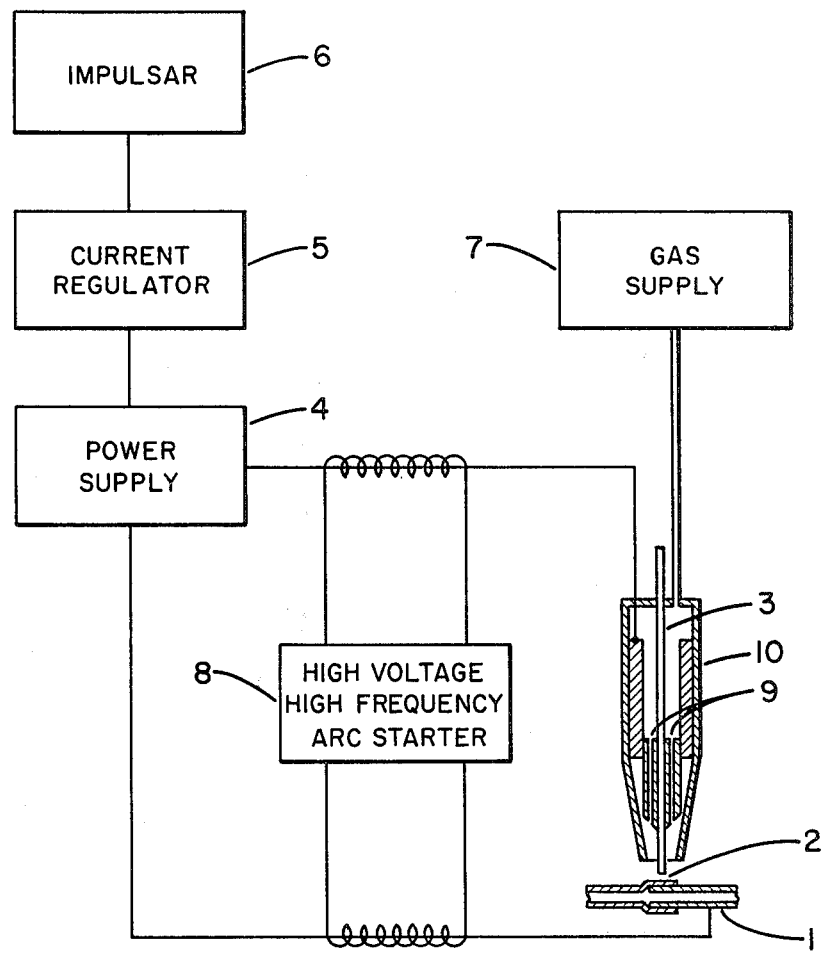
FIG. 1 shows a schematic diagram of an arc welding system for providing a pulsed positive direct current at an arc gap. The direct current pulses can be controlled to have special characteristics, determined according to the principles of the present invention, whereby fluxless welding of materials which form difficult to reduce oxides on their surfaces, such as aluminum, is possible and whereby welds of good quality can be made.

Referring now to FIG. 1, a gas-shielded arc welding system is shown for welding together work pieces 1. The work pieces 1 depicted in FIG. 1 are sections of thin wall aluminum tubing which may be used in making heat exchangers for air conditioning systems. However, the work pieces 1 may be of any type suitable for arc welding including such materials as stainless steel which do not present a surface oxide problem.

Current flow across the arc gap 2 between the electrode 3 and the work pieces 1 is determined by the operation of power supply 4. The power supply 4 may be one of a variety of power supplies which are available commercially. For purposes of the present invention, the power supply 4 is selected to provide pulsed positive direct current (DC) flow across the arc gap 2. Also, the power supply 4 is designed to be capable of providing a peak current flow across the arc gap 2 of sufficient magnitude that the method of arc welding, according to the principles of the present invention, can be accomplished. For example, when welding together certain thin wall sections of aluminum tubing used in making heat exchangers for air conditioning systems, the power supply 4 must be capable of providing current pulses having peak values of at least 100 amps and preferably having peak values in excess of 200 amps. An arc welding power supply 4 capable of providing this peak current flow is available from Creative Pathways, Inc., 2917 Lomita Blvd., Torrance, CA. 90505. When welding other materials, other peak values may be required. These peak values can be achieved by modifying conventional pulsed DC power supplies, as known by those of ordinary skill in the art, to provide a power supply 4 having the necessary output voltage to provide current pulses at the arc gap 2 having the required peak values.

The characteristics of the DC pulses provided at the arc gap 2 by the power supply 4 are controlled by current regulator 5 in response to control signals from impulsar 6. This is a conventional type of control for an arc welding power supply 4 as is well known in the field of arc welding. The current regulator 5 and impulsar 6 are capable of controlling the power supply 4 to provide current pulses of the required characteristics for accomplishing the method of arc welding according to the principles of the present invention.

Also shown in FIG. 1 are a high voltage, high frequency arc starter 8, a gas supply 7, and an electrode holder 10. These are conventional elements of a typical gas-shielded arc welding system. The gas supply 7 continuously provides inert gas during the arc welding process to the arc gap 2 through passageways 9 in the electrode holder 10. The inert gas is initially ionized by operation of arc starter 8 to provide electrical charges for initiation of current flow across arc gap 2 from the electrode 3 to the work pieces 1. After the initiation of current flow the arc starter 8 discontinues operation. Subsequently, the inert gas is ionized by the operation of the power supply 4 to sustain current flow across the arc gap 2 throughout the arc welding process. The continuous supply of inert gas prevents impurities from reaching the weld and prevents formation of surface films, such as oxides, on the work pieces 1 during the arc welding process. However, it is not necessary to supply inert gas during the welding process if other steps are taken to prevent oxide formation and impurities from reaching the weld such as providing a vacuum at the arc gap 2.

The electrode holder 10 can be one of a variety of constructions. For example, the holder 10 can be a moving head type wherein the work pieces 1 and the holder 10 are rotated relative to each other to effect welding at selected positions on the work pieces 1. The holder 10 can be operated to make a continuous weld on the work pieces 1 or a series of spot welds.

Figure 2:
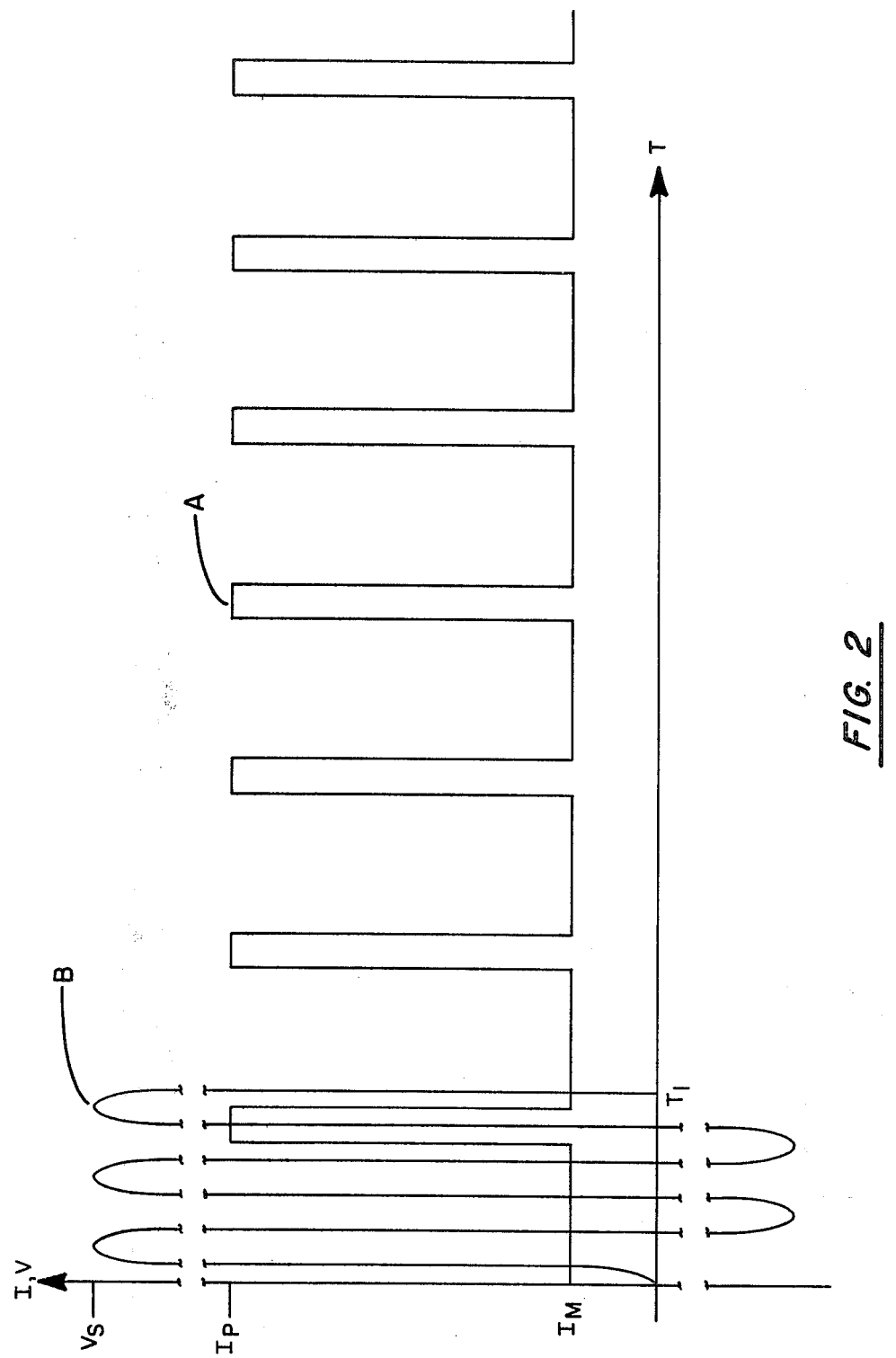
FIG. 2 shows a schematic graph of the magnitude of current flow across the arc gap as a function of time when the arc welding system depicted in FIG. 1 is operated to supply positive direct current pulses having special characteristics determined according to the principles of the present invention. Also shown is a schematic graph of the voltage applied across the arc gap as a function of time when the electric arc starter of the arc welding system shown in FIG. 1 is operated.

Referring now to FIG. 2, the curve designated A is a schematic graph of the magnitude of the pulsed direct current flow across the arc gap 2 as a function of time when the arc welding system shown in FIG. 1 is operated according to the principles of the present invention. The current flow across the arc gap 2, as depicted in FIG. 2, is achieved by the power supply 4 supplying a periodic pulsed voltage across the arc gap 2. The applied voltage is cycled so that the magnitude of the current flow is cycled between a low maintenance level $I_m$ and a high peak value $I_p$. The low maintenance level $I_m$ sustains a maintenance current flow across the arc gap 2. The power flow associated with this maintenance current flow is insufficient to heat the work pieces 1 to a temperature above their melting temperature. The high peak value $I_p$ provides a power flow capable of melting the work pieces 1. The form of the current pulses determines the power flow function to the work pieces 1. By properly adjusting the form of the current pulses optimal welding can be achieved since the power flow function is a primary factor in determining weld quality.

The general features of the pulsed DC curve A shown in FIG. 2 are typical of the operation of any pulsed DC arc welding system. However, according to the principles of the present invention the ratio of peak current $I_p$ to maintenance current $I_m$ at the leading edge of each current pulse is chosen to have special characteristics. Essentially, this ratio is chosen to be as large as possible. This is facilitated by having a maintenance current $I_m$ which is adjusted to the minimum value necessary to sustain current flow across the arc gap 2. For any pulsed DC arc welding system the peak current $I_p$ must be above that value necessary to provide a power flow to the work pieces 1 which is capable of melting the work pieces 1. However, according to the principles of the present invention, the peak current $I_p$ is maximized to give the largest possible ratio of peak current $I_p$ to maintenance current $I_m$ that is within the particular capabilities of the power supply 4 of the arc welding system. The upper limit on the magnitude of the current flow across the arc gap 2 is the vaporization temperature of the work pieces 1. The lower limit on the current flow across the arc gap 2 is the minimum current flow necessary to just maintain a maintenance current flow across the arc gap 2 after the arc starter 5 has discontinued operation after having initiated current flow across the arc gap 2.

It should be noted that in attempting to adjust conventional arc welding systems to supply a minimum current flow across the arc gap 2 a negative resistance region may be encountered. This negative resistance region is characterized by a large increase in current flow when there is a decrease in the voltage applied across the arc gap 2. The applied voltage must be substantially increased to maintain the current flow across the arc gap 2 at a low level. This phenomenon is similar to breakdown processes such as the well-known Townsend discharge. The current level at which the phenomenon occurs depends on a variety of factors including separation distance between the work pieces 1 and the electrode 3 at the arc gap 2, the composition and quantity of the inert gas supplied to the arc gap 2, the kind of material being welded, and other such factors. This phenomenon is not encountered by conventional arc welding systems since these systems normally operate at current levels well above the minimum current flow at which this phenomenon can occur. Furthermore, this phenomenon is encountered when arc welding according to the principles of the present invention only when it is attempted to supply an absolute minimum maintenance current flow across the arc gap 2. Arc welding according to the principles of the present invention can be accomplished by selecting a maintenance current flow which is slightly greater than the current flow at which the negative resistance region is encountered. If it is desirable to have a maintenance current flow which is within the negative resistance region then the applied voltage at the arc gap 2 must be properly adjusted to compensate for this phenomenon.

The primary purpose of maximizing the ratio of peak current $I_p$ to maintenance current $I_m$ at the leading edges of each current pulse is to provide a thermal shock effect. The use of this effect allows materials, such as aluminum, magnesium and beryllium copper, which form difficult to reduce oxides on their surfaces to be DC arc welded without using a flux. A related kind of thermal shock effect is well known in the field of vacuum brazing where this phenomenon is used as part of a multi-step process to join together work pieces by brazing. The effect results from rapidly heating work pieces having surfaces oxides with a coefficient of thermal expansion which is substantially less than the coefficient of thermal expansion of the underlying pure material. The rapid heating causes an uneven rate of expansion which fractures and splits apart the oxides on the surfaces of the work pieces.

During the pulsed DC arc welding process of the present invention the split apart oxides are pushed away from the weld area due to the melting and joining of the pure materials below the oxide layers. Other physical phenomena also may be responsible for the dissipation of the oxides when arc welding according to the principles of the present invention but the thermal shock effect is believed to be the primary mechanism by which the oxides are dissipated. Regardless of the exact physical phenomena which underlies the oxide dissipation, the feature of maximizing the ratio of peak current $I_p$ to maintenance current $I_m$ at the leading edge of each current pulse is an essential element of arc welding according to the principles of the present invention. This particular feature is best explained when it is assumed that the thermal shock effect is the primary mechanism by which oxides are dissipated.

The exact value of the ratio of peak current $I_p$ to maintenance current $I_m$ at the leading edge of each current pulse for providing a thermal shock effect is dependent on the kind of material being welded, the thickness of the material, and other such factors. For thin wall aluminum tubing, such as the aluminum tubing used in making heat exchangers for air conditioning systems, it has been found that a ratio of peak current $I_p$ to maintenance current $I_m$ of at least 7.5 results in the formation of good quality welds when the tubing is of a thickness of approximately 0.03 to 0.06 inches and a low maintenance current of approximately 15 amps is utilized. Also, it has been found that increasing the ratio of peak current $I_p$ to maintenance current $I_m$ above 7.5 further improves the quality of the welds. These current ratios are preferably used with DC positive pulses having a frequency between 1 and 50 hertz with a duty cycle of 10 to 20%.

It is preferable to use a periodic series of current pulses when arc welding according to the principles of the present invention but this type of operation is not required to achieve the advantages of the present invention. The pulses only need to have the required ratio of peak current $I_p$ to maintenance current $I_m$ at the leading edge of each current pulse to produce the thermal shock effect. Also, the pulses must have a peak current $I_p$ of sufficient duration to melt the work pieces 1 at the weld joint.

It should be noted that if the current is maintained at the peak current value $I_p$ for too long a period of time the power flow to the work pieces 1 may result in adverse consequences at the work pieces 1 such as burning through parts of the work pieces 1 or in sagging of the work pieces 1 at the weld joint. This may result in a poor quality weld being made. Thus, it is important to properly control the power flow to the work pieces 1. Preferably, this power flow is controlled by selecting a peak current $I_p$ pulse duration which results in a good quality weld being made on the particular work pieces 1 which are being welded. This optimal peak current $I_p$ pulse duration is selected through a trial and error process. If a periodic series of current pulses are used then the optimal peak current $I_p$ pulse duration results in an optimal duty cycle for the current pulses. This optimal duty cycle supplies the proper power flow necessary to make a plurality of good quality welds on the work pieces 1.

Typically, the optimal peak current $I_p$ pulse duration is that pulse duration which supplies just enough energy to melt and join together the work pieces 1 at the weld joint. This is because the work pieces 1 cool during the time periods between the peak current $I_p$ flow across the arc gap 2. The welds are completed during these cooling time periods and weld quality is dependent on sufficient cooling time being available to allow the work pieces 1 to cool to substantially the temperature of the work pieces 1 when only the maintenance current $I_m$ is flowing across the arc gap 2. This prevents the occurrence of the adverse consequences of too much power flow as noted above. Also, sufficient cooling time is required between pulses so that after one pulse has occurred the work pieces 1 can cool to a temperature whereby a thermal shock effect can occur when the current increases to the peak current $I_p$ at the leading edge of the next current pulse. The required amount of cooling time, necessary to insure that each current pulse creates a thermal shock effect, can be decreased by operating with an absolute minimum maintenance current $I_m$. However, it may be desirable to have a maintenance current $I_m$ which is above this absolute minimum to avoid a negative resistance region. Also, a slightly higher maintenance current $I_m$ may otherwise facilitate the operation of the arc welding system thereby making it more advantageous to adjust pulse duration rather than maintenance current $I_m$ to achieve the required cooling.

Also, shown in FIG. 2, is the arc starter voltage as a function of time during the start-up of the arc welding process. This voltage curve is designated as curve B in FIG. 2. The arc starter peak voltage $V_s$ must be sufficient to ionize the inert gas supplied at the arc gap 2 and must be sufficient to initiate current flow across the arc gap 2. For the thin wall aluminum tubing used in making heat exchangers for air conditioning systems discussed previously, a typical arc starter peak voltage $V_s$ is approximately 25 kilovolts. The arc starter 5 is turned off after a time $T_1$ during which the ionization and initiation of current flow occurs.

The method of arc welding according to the principles of the present invention is better understood when contrasted with conventional pulsed DC arc welding methods. In these conventional methods the current flow across the arc gap 2 is cycled between a high value and a low value to cycle the work pieces 1 between a temperature below their melting temperature to a temperature above their melting temperature to make a weld. The high and low current values are normally maintained near the current level necessary to just melt the work pieces 1. This mode of operation should be contrasted with the method of arc welding according to the principles of the present invention in which the ratio of peak current $I_p$ to maintenance current $I_m$ is preferably maximized at the leading edge of each current pulse. Conventional pulsed DC arc welding teaches maintaining this ratio at a relatively low value.

Also, it should be noted that with conventional pulsed DC arc welding techniques the power flow to the work pieces 1 is typically controlled by adjusting the peak current $I_p$. If too much or too little power is flowing to the work pieces 1 the peak current $I_p$ is decreased or increased, respectively. The present invention teaches keeping the ratio of peak current $I_p$ to maintenance current $I_m$ at the leading edge of each current pulse at a constant value. This is necessary to insure that rapid heating occurs for achieving the thermal shock effect. Thus, when arc welding according to the principles of the present invention it is not desirable to control power flow to the work pieces 1 by adjusting the peak current $I_p$.

Also, while the time period in which the current increases from the maintenance level $I_m$ to the peak value $I_p$ is relatively unimportant when using conventional pulsed DC arc welding techniques this time period is of critical importance when using the method of arc welding according to the principles of the present invention. To properly achieve thermal shock and fracturing of oxides this increase preferably occurs essentially instantaneously since, according to the principles of the present invention, it is rapid heating which is believed to be primarily responsible for dissipating the oxides on the surfaces of the work pieces 1.

Finally, it should be noted that, although the method of arc welding according to the principles of the present invention is particularly suited for welding materials, such as aluminum, which form difficult to reduce oxides on their surfaces, many other materials can be welded using this method. For example, stainless steel work pieces, especially thin wall stainless steel work pieces, can be welded together using this method to make a weld of high quality. Therefore, while the present invention has been described in connection with particular embodiments, it is to be understood that other embodiments and various modifications can be made without departing from the invention heretofore described and claimed in the appended claims.

What is claimed is:

1. A method of arc welding of work pieces having surface oxides which comprises:
   positioning an electrode and the work pieces relative to each other to form an arc gap;
   providing inert gas continuously at the arc gap;
   applying across the arc gap an arc starter voltage having a magnitude sufficient to ionize the inert gas and initiate current flow across the arc gap;
   discontinuing the arc starter voltage;
   providing a maintenance current flow across the arc gap which is sufficient to sustain a minimum current flow across the arc gap throughout the arc welding process, said maintenance current providing a power flow which is insufficient to increase the temperature of the work pieces to the melting temperature of the work pieces;
   increasing the magnitude of the current flowing across the arc gap to a peak value which can provide sufficient power flow to melt the work pieces and which is of sufficient magnitude that a power flow is provided which dissipates oxides on the surfaces of the work pieces during the time interval in which the increase in current flow occurs;
   holding the current flow across the arc gap at substantially the increased value for a duration of time sufficient to provide enough energy to heat the work pieces to their melting temperature;
   decreasing the magnitude of the current flowing across the arc gap to substantially the maintenance current value to allow the temperature of the work pieces to decrease to a temperature below their melting temperature whereby the work pieces are welded together;
   cycling the current flow across the arc gap by repeating the steps of increasing, holding, and decreasing the current flow to vary the magnitude of the current flowing across the arc gap between the maintenance current value and the peak current value to form a series of current pulses which are applied to the work pieces; and
   changing the relative position of the electrode and the work pieces to direct each current pulse to a selected portion of the work pieces.

2. The method as recited in claim 1 wherein the work pieces are made of aluminum having a thickness between approximately 0.03 and 0.06 inches.

3. The method as recited in claim 2 wherein the ratio of the magnitude of the peak current to the magnitude of the maintenance current is at least 7.5.

4. The method as recited in claim 3 wherein the current pulses vary periodically with a frequency between 1 and 50 hertz and with a duty cycle of 10 to 20%.

5. The method as recited in claim 1 wherein the relative position of the electrode and the work pieces is changed to direct the current pulses to overlapping portions of the work pieces to form a continuous weld on the work pieces.

6. The method as recited in claim 1 wherein the relative position of the electrode and the work pieces is changed to direct the current pulses to distinct portions of the work pieces to form a series of spot welds on the work pieces.

* * * * *